(12) United States Patent
Gao et al.

(10) Patent No.: US 10,917,159 B2
(45) Date of Patent: Feb. 9, 2021

(54) BEAM INFORMATION FEEDBACK METHOD AND APPARATUS, AND CONFIGURATION INFORMATION FEEDBACK METHOD AND APPARATUS

(71) Applicant: ZTE CORPORATION, Guangdong (CN)

(72) Inventors: Bo Gao, Shenzhen (CN); Yu Ngok Li, Shenzhen (CN); Zhaohua Lu, Shenzhen (CN); Yifei Yuan, Shenzhen (CN); Xinhui Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/505,243

(22) Filed: Jul. 8, 2019

(65) Prior Publication Data

US 2020/0014455 A1   Jan. 9, 2020

Related U.S. Application Data

(63) Continuation of application No. PCT/CN2017/111771, filed on Nov. 18, 2017.

(30) Foreign Application Priority Data

Jan. 9, 2017  (CN) .......................... 2017 1 0015073
Mar. 24, 2017 (CN) .......................... 2017 1 0184863

(51) Int. Cl.
*H04B 7/08*    (2006.01)
*H04B 17/318*  (2015.01)
(Continued)

(52) U.S. Cl.
CPC ......... *H04B 7/0857* (2013.01); *H04B 7/0626* (2013.01); *H04B 7/0632* (2013.01);
(Continued)

(58) Field of Classification Search
CPC ... H04L 5/0048; H04L 5/0023; H04L 5/0057; H04L 25/0226; H04L 27/2666;
(Continued)

(56) References Cited

U.S. PATENT DOCUMENTS

2007/0298742 A1   12/2007  Ketchum et al.
2015/0003325 A1    1/2015  Sajadieh et al.
(Continued)

FOREIGN PATENT DOCUMENTS

CN   103634037 A   3/2014
CN   104205911 A   12/2014
(Continued)

OTHER PUBLICATIONS

Extended European Search Report on EP 17889871.4 dated Feb. 4, 2020 (12 pages).
(Continued)

*Primary Examiner* — Rahel Guarino
(74) *Attorney, Agent, or Firm* — Foley & Lardner LLP

(57) ABSTRACT

Presented herein are systems and methods for beam information feedback. A first communication node may receive, from a second communication node, a group of reference signals that are carried either on respective beams or on a same beam. The group of reference signals may be determined based on one or more time-frequency-code resources. The first communication node may determine, based on the group of reference signals, one or more beam indexes and channel state information. The first communication node may transmit, to the second communication node, a set including the one or more beam indexes and the channel state information.

12 Claims, 7 Drawing Sheets

(51) Int. Cl.
*H04B 7/06* (2006.01)
*H04L 5/00* (2006.01)
*H04L 27/26* (2006.01)

(52) U.S. Cl.
CPC ........... *H04B 7/088* (2013.01); *H04B 17/318* (2015.01); *H04L 5/0048* (2013.01); *H04L 27/2666* (2013.01)

(58) Field of Classification Search
CPC .. H04B 7/0617; H04B 7/0408; H04B 7/0632; H04B 17/318; H04B 7/0619; H04B 7/0857; H04B 17/24; H04B 17/309; H04B 7/0697; H04B 7/08; H04B 7/0482; H04B 17/0626; H04B 17/088; H04W 72/042; H04W 72/046; H04W 16/28; H04W 72/02; Y02D 70/1264
See application file for complete search history.

(56) References Cited

U.S. PATENT DOCUMENTS

2016/0323029 A1 11/2016 Cheng et al.
2017/0033856 A1* 2/2017 Su .......................... H04W 16/28
2019/0104549 A1* 4/2019 Deng ................... H04B 7/0617

FOREIGN PATENT DOCUMENTS

CN 105227281 A 1/2016
WO WO-2016/086144 A1 6/2016

OTHER PUBLICATIONS

International Search Report and Written Opinion for International Appl. No. PCT/CN2017/111771, dated Feb. 9, 2018.

* cited by examiner

BEAM INFORMATION FEEDBACK METHOD AND APPARATUS, AND CONFIGURATION INFORMATION FEEDBACK METHOD AND APPARATUS

CROSS-REFERENCE TO RELATED APPLICATIONS

This application claims the benefit of priority under 35 U.S.C. § 120 as a continuation of PCT Patent Application No. PCT/CN2017/111711 filed on Nov. 18, 2017, which claims priority to Chinese patent application Nos. 201710184863.2 filed on Mar. 24, 2017, and 201710015073.1 filed on Jan. 9, 2017, the disclosure of each of which is incorporated herein by reference in its entirety.

TECHNICAL FIELD

The present disclosure relates to the field of communications, in particular to beam information feedback method and apparatus, and configuration information feedback method and apparatus.

BACKGROUND

The ultra-wide-bandwidth high frequency band communication, namely millimeter wave communication has become an important direction for the development of mobile communication in the future, and attracts the attention of academic and industrial circles around the world. In particular, the advantages of millimeter waves become increasingly attractive as increasingly congested spectrum resources and physical networks are heavily accessed at present. Many standard organizations such as the Institute of Electrical and Electronics Engineers (IEEE) and the 3rd Generation Partnership Project (3GPP) start to carry out corresponding standardization work. For example, in the 3GPP standard group, high-frequency band communication will become an important innovation point of the 5G new radio access technology (New RAT) due to its significant advantage of large bandwidth.

However, high-frequency band communication also has the problem of link attenuation such as large propagation path loss, large absorption by air (especially by oxygen), and heavy effect of rain attenuation. In view of the above problems, the high-frequency band communication system can use features such as short wavelengths and easy antenna integration in the high frequency band to obtain high antenna gain and counter signal transmission loss through the multi-antenna array and the beamforming scheme, thereby ensuring link margin and improving communication robustness.

During antenna weight (also referred to as precoding and beam) training, the high-frequency band sending end sends a training pilot, and the receiving end receives a channel and performs channel estimation. Then, the high-frequency band receiving end needs to feed back channel state information to the training sending end, so that the receiving and sending ends can find, from the optional receiving and sending end antenna weight pairs, multiple groups of receiving and sending end antenna weight pairs that can be used for multi-channel data transmission, and the overall spectral efficiency is improved.

In the existing millimeter wave communication system, beam-related information feeds back multiple optimal channel qualities and beam indexes under the multiple optimal channel qualities to generate corresponding beam pairs for data transmission. However, in case of generating multiple beam pairs for obtaining spatial diversity or multiplexing gain, multiple beam pairs provided by the existing feedback scheme may be from the same physical path and have a very strong correlation. For example, in a case that an optimal beam pair is selected to transmit data and is shielded, a sub-optimal beam pair in the existing method, having a high correlation with the optimal beam, also has a high probability of being shielded, that is, the diversity gain cannot be effectively obtained. Therefore, in the existing art, the receiving end cannot learn of the beam index and the channel state information from the feedback of the sending end, so the receiving end cannot provide feedback on the correlation between the beams and the sending end cannot perform accurate and flexible data transmission according to the correlation from the receiving end, thereby decreasing the diversity and multiplexing gain of the system.

No effective solution has yet been proposed for the above problem in the existing art.

SUMMARY

Embodiments of the present disclosure provide a beam information feedback method and apparatus, and configuration information feedback method and apparatus, to at least solve the problem, in the existing art, of decreased diversity and multiplexing gain of a system because the sending end cannot perform accurate and flexible data transmission according to related characteristics of the receiving end since the receiving end cannot feed back correlation characteristics of beams.

An embodiment of the present disclosure provides a beam information feedback method. The method includes that: a receiving end receives reference signals sent by a sending end, where the reference signals are carried on one or more beams, or each reference signal group is carried on a same beam, and the reference signal group is obtained by grouping the reference signals with one or more time-frequency-code resources; the receiving end obtains one or more beam indexes and channel state information according to the reference signals; and the receiving end sends a set including the one or more beam indexes and the channel state information to the sending end.

Another embodiment of the present disclosure provides a beam information feedback apparatus.

The apparatus includes: a first receiving module, which is configured to receive reference signals sent by a sending end, where the reference signals are carried on one or more beams, or each reference signal group is carried on a same beam, and the reference signal group is obtained by grouping the reference signals with one or more time-frequency-code resources; an obtaining module, which is configured to obtain one or more beam indexes and channel state information according to the reference signals; and a first sending module, which is configured to send a set including the one or more beam indexes and the channel state information to the sending end.

Another embodiment of the present disclosure provides a receiving end including a communication apparatus and a processor. The communication apparatus is configured to: receive reference signals sent by a sending end, where the reference signals are carried on one or more beams, or each reference signal group is carried on a same beam, and the reference signal group is obtained by grouping the reference signals with one or more time-frequency-code resources; and send a set including one or more beam indexes and channel state information to the sending end. The processor is configured to obtain the set according to reference signals.

Another embodiment of the present disclosure provides a receiving end. The receiving end includes a communication apparatus which is configured to send configuration information of an antenna and a beam to a sending end. The configuration information is used for instructing the sending end to configure the antenna or the beam of the sending end.

Another embodiment of the present disclosure further provides a storage medium. The storage medium is configured to store program codes for executing steps described below. A receiving end receives reference signals sent by a sending end, where the reference signals are carried on one or more beams, or each reference signal group is carried on a same beam, and the reference signal group is obtained by grouping the reference signals with one or more time-frequency-code resources; the receiving end obtains one or more beam indexes and channel state information according to the reference signals; and the receiving end sends a set including the one or more beam indexes and the channel state information to the sending end.

Another embodiment of the present disclosure further provides a storage medium. The storage medium is configured to store program codes for executing a step described below. A receiving end sends configuration information of an antenna and a beam to a sending end, where the configuration information is used for instructing the sending end to configure the antenna or the beam of the sending end.

Through the present disclosure, the receiving end receives the reference signals sent by the sending end, obtains the one or more beam indexes and the channel state information according to the reference signals, and then feeds back the set including the one or more beam indexes and the channel state information to the sending end, achieving feedback of the beam and the channel state information from the receiving end. Therefore, the problem of decreased diversity and multiplexing gain of a system because the sending end cannot perform accurate and flexible data transmission according to correlation from the receiving end since the receiving end cannot feed back the correlation between beams due to the receiving end failing to obtain the beam index and the channel state information according to the feedback from the sending send is solved. Thus, the sending end can perform accurate and flexible data transmission according to the related characteristics of the receiving end, and the diversity and multiplexing gain of the system are improved.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish similar objects from each other and are not necessarily used to describe a particular order or sequence.

First Embodiment

Figure 1:
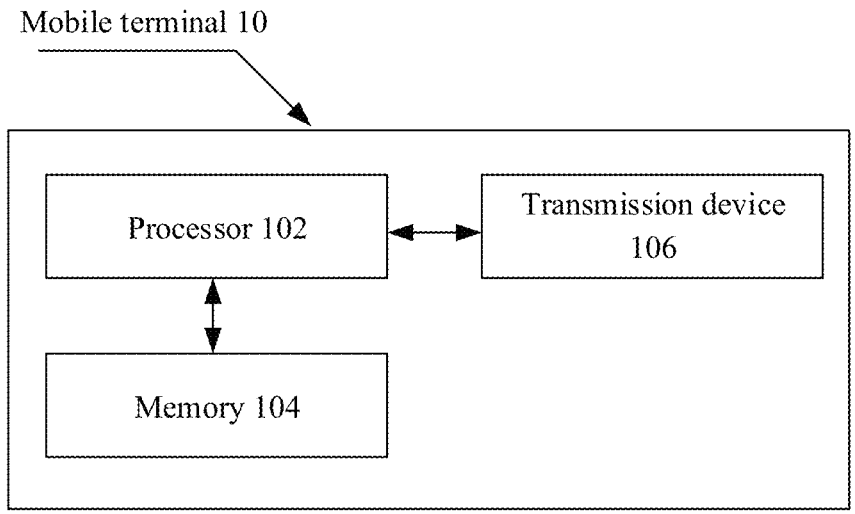
FIG. 1 is a block diagram of a hardware structure of a mobile terminal of a beam information feedback method according to an embodiment of the present disclosure.

The method embodiment provided by a first embodiment of the present application may be executed on a mobile terminal, a computer terminal or other similar computing apparatuses. Taking the method to be executed on the mobile terminal as an example, FIG. 1 is a block diagram of a hardware structure of a mobile terminal of a beam information feedback method according to the embodiment of the present disclosure. As shown in FIG. 1, a mobile terminal 10 may include one or more (only one is shown in FIG. 1) processors 102 (the processor 102 may include, but is not limited to, a processing device such as a microcontroller unit (MCU) or a field programmable gate array (FPGA)), a memory 104 used for storing data, and a transmission device 106 used for implementing a communication function. It should be understood by those skilled in the art that the structure shown in FIG. 1 is merely illustrative and not intended to limit the structure of the electronic apparatus described above. For example, the mobile terminal 10 may further include more or fewer components than the components shown in FIG. 1 or may have a configuration different from that shown in FIG. 1.

The memory 104 may be used for storing software programs and modules of an application software, such as program instructions/modules corresponding to the beam information feedback method in the embodiment of the present disclosure. The processor 102 executes the software programs and modules stored in the memory 104 so as to perform various functional applications and data processing, that is, to implement the method described above. The memory 104 may include a high-speed random access memory, or a nonvolatile memory such as one or more magnetic storage devices, flash memories or other nonvolatile solid-state memories. In some examples, the memory 104 may include memories that are remotely disposed with respect to the processor 102. These remote memories may be connected to the mobile terminal 10 via a network. Examples of the preceding network include, but are not limited to, the Internet, an intranet, a local area network, a mobile communication network and a combination thereof.

The transmission device 106 is configured to receive or send data via a network. Specific examples of such a network may include a wireless network provided by a communication provider of the mobile terminal 10. In one example, the transmission device 106 includes a network interface controller (NIC), which may be connected to other network devices via a base station and thus be capable of communicating with the Internet. In one example, the transmission device 106 may be a radio frequency (RF) module, which is used for communicating with the Internet in a wireless way.

Figure 2:
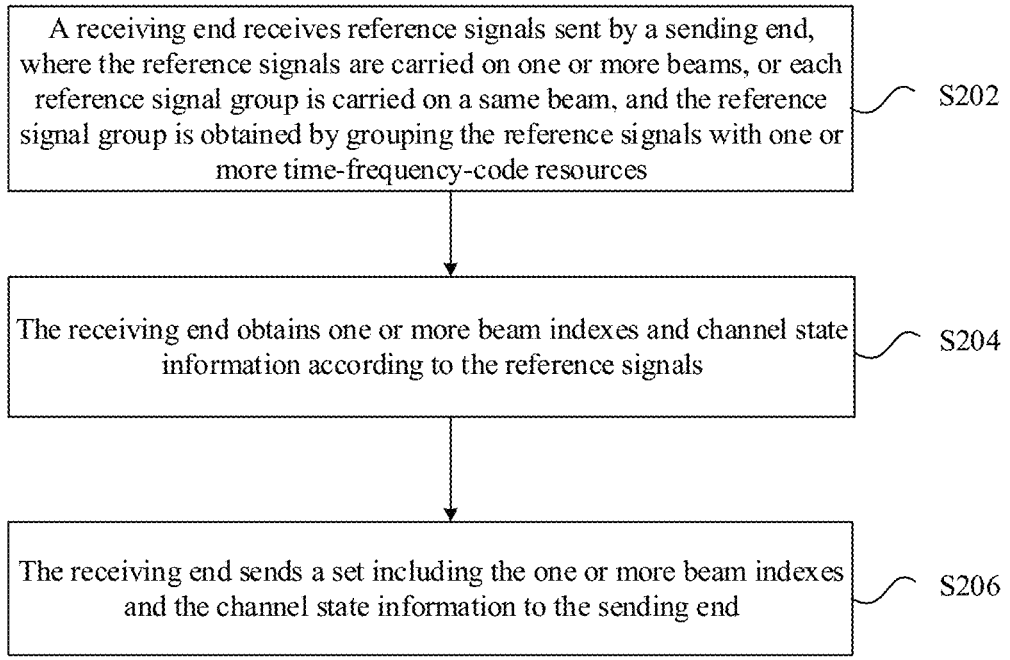
FIG. 2 is a flowchart of a beam information feedback method according to an embodiment of the present disclosure.

FIG. 2 is a flowchart of a beam information feedback method according to an embodiment of the present disclosure. As shown in FIG. 2, the beam information feedback method includes steps described below.

In step S202, a receiving end receives reference signals sent by a sending end. The reference signals are carried on one or more beams, or each reference signal group is carried on a same beam, where the reference signal group is obtained by grouping the reference signals with one or more time-frequency-code resources.

In step S204, the receiving end obtains one or more beam indexes and channel state information according to the reference signals.

In step S206, the receiving end sends a set including the one or more beam indexes and the channel state information to the sending end.

In the embodiment, the beam index corresponds to an antenna port index, a resource index, or a index of a sequence, but is not limited thereto. The beam is a resource, e.g., a sending end precoding, a receiving end precoding, an antenna port, an antenna weight vector, an antenna weight matrix, and the like. The beam index may be replaced with a resource index because the beam may be bound to some time-frequency-code resources for transmission. The beam may also be a transmission (e.g., sending or receiving) mode. The transmission mode may include spatial multiplexing, frequency domain/time domain diversity, and the like. The channel state information includes a precoding matrix indicator (PMI), a channel quality indicator (CQI), a reference signal receiving power (RSRP), a reference signal receiving quality (RSRQ), and the like.

Through the above steps, the receiving end receives the reference signals sent by the sending end, obtains the one or more beam indexes and the channel state information according to the reference signals, and then feeds back the set including the one or more beam index and the channel state information to the sending end, achieving feedback of the beam and the channel state information from the receiving end. Therefore, the problem of decreased diversity and multiplexing gain of a system because the sending end cannot perform accurate and flexible data transmission according to correlation from the receiving end since the receiving end cannot feed back the correlation between beams due to the receiving end failing to obtain the beam index and the channel state information according to the feedback from the sending send is solved. Thus, the sending end can perform accurate and flexible data transmission according to the correlation from the receiving end, and the diversity and multiplexing gain of the system are improved.

Optionally, the above steps may, but may not necessarily, be executed by a base station, a terminal or the like.

In an optional embodiment, the set described above includes Q group(s), where Q is an integer greater than or equal to 1; and each group includes at least one of: at least one of the one or more beam indexes, the channel state information, group information or a spatial parameter information set.

In the embodiment, each group includes one or more of: at least one of the one or more beam index, the channel state information, the group information or the spatial parameter information set, but the set described above includes the one or more beam indexes and the channel state information. The grouping of the above set may refer to grouping the beams having the same channel characteristics and/or the same transmission scheme and related channel state information into a group. The channel characteristics not only include physical propagation channel characteristics such as a horizontal sending azimuth, a vertical sending azimuth, a horizontal receiving azimuth, a vertical receiving azimuth, but also include characteristics of a radio frequency circuit and a baseband circuit, such as antenna array characteristics, antenna placement, and baseband time offset, baseband frequency offset and baseband phase noise.

The criterion for grouping includes at least one of the following:

performing grouping according to a receiving signal power;

performing grouping according to the horizontal sending azimuth;

performing grouping according to the vertical sending azimuth;

performing grouping according to the horizontal receiving azimuth;

performing grouping according to the vertical receiving azimuth;

performing grouping according to average arrival time;

performing grouping according to cluster arrival time;

performing grouping according to a receiving resource corresponding to the resource;

performing grouping according to a predetermined multiplexing manner;

performing grouping according to a timing advance (TA) parameter;

performing grouping according to a cyclic prefix (CP) length;

performing grouping according to a spatial multiplexing manner; or performing grouping according to a Quasi-Co-Location (QCL) relationship.

The embodiments of the present disclosure are not limited to the above criteria for grouping, and a group may be referred to as a set.

In an optional embodiment, the above beam index includes at least one of: a transmit beam index or a receive beam index; the channel state information includes at least one of: transmit beam channel state information, receive beam channel state information, or transmit beam and receive beam combined channel state information; and the spatial parameter information set includes at least one of: a transmit beam spatial parameter information set, a receive beam spatial parameter information set, or a transmit beam and receive beam combined spatial parameter information set.

In the embodiment, the receive beam is a beam of a receiving end that does not need to be instructed, or a beam resource of the receiving end indicated by a sending end through the QCL of a current reference signal and a current antenna port and the QCL of a reference signal (or a base reference signal) and an antenna port fed back and reported by the receiving end.

Optionally, the set after grouping may be carried on a physical uplink shared channel (PUSCH), the receiving end may feed back channel-related property between the beams to the sending end by using an explicit spatial parameter or implicit beam grouping feedback method, and a report format combination of the set after grouping is as follows.

Scheme 1: N groups are included, each group includes a group index, one or more transmit beam indexes, and channel state information of an optimal beam among feedback transmit beams. The number of transmit beams inside each group may be different, and the report format is: {group index, {transmit beam index, . . . , transmit beam index}, channel state information of the optimal beam}, specifically as listed in Table 1.

TABLE 1

| Group index_1 | Transmit beam index_1 ... Transmit beam index_$K_1$ | Channel state information (such as RSRP or RSRQ) of the optimal beam with the group index_1 |
|---|---|---|
| Group index_2 | Transmit beam index_1 ... Transmit beam index_$K_2$ | Channel state information (such as RSRP or RSRQ) of the optimal beam with the group index_2 |
| ... | ... | ... |

Scheme 2: N groups are included, each group includes a receive beam index (or a virtual index of the receive beam, or a quasi-receive beam index), each receive beam feeds back K transmit beams, the number of receive beams is M, and the report format is as follows:

{{transmit beam index, channel state information}, . . . , {transmit beam index, channel state information}} . . . . The report format includes K pieces of {transmit beam index, channel state information}, as listed in Table 2.

TABLE 2

| Receive beam index_1 | Transmit beam index_1 ... Transmit beam index_K | Channel state information (such as RSRP or RSRQ) ... RSRQ) |
|---|---|---|
| ... | ... | ... |

Scheme 3: The report format is: {transmit beam index, channel state information, group index}, . . . Group indexes may be distinguished by a time domain, a frequency domain, or a code domain. The criterion for grouping K transmit beams into one group is that the K transmit beams jointly correspond to one receive beam or one beamforming implementation mode. The group indexes are sequentially sorted in ascending order starting from 0, as listed in Table 3.

TABLE 3

| Group index_1 | Transmit beam index_1 | Channel state information (such as RSRP or RSRQ) |
|---|---|---|
| Group index_2 | Transmit beam index_2 | Channel state information (such as RSRP or RSRQ) |
| Group index_3 | Transmit beam index_3 | Channel state information (such as RSRP or RSRQ) |
| Group index_4 | Transmit beam index_4 | Channel state information (such as RSRP or RSRQ) |
| Group index_5 | Transmit beam index_5 | Channel state information (such as RSRP or RSRQ) |
| ... | ... | ... |

Based on grouping in the scheme 3 and according to whether the groups correspond to the same transceiver units (TXRU) or the same antenna panel, grouping of a higher layer is performed on existing groups, and main group indexes of the higher layer are added with a format as listed in Table 4. That is, the criterion for top-layer grouping is to divide information corresponding to the same TXRU or the same antenna panel into a group. The criterion for bottom-layer grouping is to divide information of the same receive beam or the same receiving mode and corresponding to the same TXRU or the same antenna panel into a group. A bottom-layer group is a subset of a top-layer group. Optionally, all group indexes may be embodied in an implicit form, such as may be embodied by a position of the time-frequency resource occupied by the group information related to the group index.

TABLE 4

| Main group index_1 | Group index_1 | Transmit beam index_1 | Channel state information (such as RSRP or RSRQ) |
|---|---|---|---|
| | Group index_2 | Transmit beam index_2 | Channel state information (such as RSRP or RSRQ) |
| Main group index_2 | Group index_3 | Transmit beam index_3 | Channel state information (such as RSRP or RSRQ) |
| | Group index_4 | Transmit beam index_4 | Channel state information (such as RSRP or RSRQ) |
| | Group index_5 | Transmit beam index_5 | Channel state information (such as RSRP or RSRQ) |
| ... | ... | ... | ... |

Optionally, grouping of higher layers (greater than or equal to 3 layers) is allowed, characterized in that information included in a bottom-layer group is a subset of information of a higher-layer group.

Scheme 4: The report format is: {transmit beam index, channel state information, spatial parameter information set}, . . . . The group indexes may be distinguished by a radio frequency resource in use, as listed in Table 5.

TABLE 5

| Transmit beam index_1 | Channel state information (such as RSRP or RSRQ) | Spatial parameter information set |
|---|---|---|
| Transmit beam index_2 | Channel state information (such as RSRP or RSRQ) | Spatial parameter information set |
| Transmit beam index_3 | Channel state information (such as RSRP or RSRQ) | Spatial parameter information set |
| Transmit beam index_4 | Channel state information (such as RSRP or RSRQ) | Spatial parameter information set |
| Transmit beam index_5 | Channel state information (such as RSRP or RSRQ) | Spatial parameter information set |
| ... | ... | ... |

In an optional embodiment, the group information is one of the following information: a group index; a reference beam index; and a reference QCL index.

In an optional embodiment, the receiving end selects a beam by at least one of the following criteria: the maximum signal-to-noise ratio of the receiving end; the maximum signal to interference plus noise ratio of the receiving end; the maximum received signal strength; or the maximum received signal quality.

In the embodiment, the beam is selected more accurately by using the above-mentioned criteria.

In an optional embodiment, channel characteristics and/or transmission schemes of multiple groups having the same group information satisfy at least one of the following conditions: the transmission schemes are the same; the channel characteristics are the same; or the channel characteristics are quasi-same. The channel characteristics being quasi-same refers to that a difference between the channel characteristics is within a specified range or constraint which is dynamically configured or pre-defined.

In the embodiment, the same group information may be same parameter of at least one of: receiving signal power, a horizontal sending azimuth, a vertical sending azimuth, a horizontal receiving azimuth, a vertical receiving azimuth, average arrival time, cluster arrival time, a predetermined multiplexing manner, a TA parameter, a CP length, a spatial multiplexing manner, or a QCL relationship.

In an optional embodiment, the group information is transmitted in one of the following manners: a time-frequency-code resource carrying the group information; and explicitly outputting the group information.

In an optional embodiment, each group further includes a terminator. The terminator is located at an end position of the group and/or an end position of the set.

In an optional embodiment, the terminator is transmitted in one of the following manners: a time-frequency-code resource carrying the group information; limiting the number of groups and the number of sets sent by the receiving end using periodic or semi-periodic feedback in each period to 1; limiting the number of groups and the number of sets sent by the receiving end using the periodic or semi-periodic feedback under aperiodic triggering to 1; and explicitly outputting the terminator indicated by a specific value or a value in a valid range of a non-feedback signal.

In an optional embodiment, the spatial parameter information set includes at least one of: an angle of arrival; a beam width; an optimal receiving angle of a receive beam; subband channel estimation; average delay; a spatial correlation coefficient; a time domain channel response correlation coefficient; or a frequency domain channel response correlation coefficient.

In the embodiment, the angle of arrival may include a horizontal angle of arrival and a vertical angle of arrival. The beam width refers to a beam width, such as a half-power beam width, of a specific attenuation in a case of being not greater than the maximum beam gain. The optimum receiving angle of the receive beam may include a horizontal angle and a vertical angle. The average delay refers to a weighted average value, such as a root-mean-square delay, at a relative delay. The spatial correlation coefficient is a correlation value of a precoding weight corresponding to two beams, or a correlation value of a beam spatial domain gain map. The time domain channel response correlation coefficient or the frequency domain channel response correlation coefficient is a corresponding correlation value of a time domain or frequency domain channel corresponding to two beams.

Optionally, a report format combination of a set including the beam index and the channel state information is as listed in Table 6, and each group has a group index. Each group has fixed K transmit beam indexes, a spatial parameter information set and RSRP information. The spatial parameter information set includes a horizontal angle of arrival and a vertical angle of arrival. The horizontal angle of arrival and the vertical angle of arrival in the spatial parameter information set may be obtained by using an estimation method of the angle of arrival, or may be represented by the direction angle of the receive beam that obtains the maximum power. For a case where only the 1D antenna array is required, the horizontal angle of arrival or the vertical angle of arrival that cannot be obtained may be configured as 0 by default.

TABLE 6

| Group index_1 | Transmit beam index_1 | Spatial parameter information set (horizontal angle of arrival, vertical angle of arrival), RSRP |
|---|---|---|
| | ... | ... |
| | Transmit beam index_3 | Spatial parameter information set (horizontal angle of arrival, vertical angle of arrival), RSRP |
| Group index_2 | Transmit beam index_1 | Spatial parameter information set (horizontal angle of arrival, vertical angle of arrival), RSRP |
| | ... | ... |
| | Transmit beam index_3 | Spatial parameter information set (horizontal angle of arrival, vertical angle of arrival), RSRP |
| Group index_3 | Transmit beam index_1 | Spatial parameter information set (horizontal angle of arrival, vertical angle of arrival), RSRP |
| | ... | ... |
| | Transmit beam index_3 | Spatial parameter information set (horizontal angle of arrival, vertical angle of arrival), RSRP |
| ... | ... | ... |

Optionally, Table 6a shows an embodiment of a report format combination format of a set including the beam index and the channel state information. A higher-level group is a receive beam set group, and a lower-level group is an antenna set group. Optionally, the antenna set group is a receive antenna set group. Optionally, the lower-level groups are represented by the same group index (virtual antenna set group index), and at each higher level, information from that antenna panel/TXRU is implicitly added. Under the same receive beam set, the reported different transmit beams may be simultaneously received by the user. Optionally, under different antenna sets and the same receive beam set, the reported different transmit beams may be used in the spatial multiplexing mode. Under the same antenna set and the same receive beam set, the reported different transmit beams may not be used in the spatial multiplexing mode. Under different receive beam sets, the reported different transmit beams may not be simultaneously received by the user. Beams under the same receive beam set group and the same antenna set group are quasi-co-located. The base station configures a base station-side transmit beam group for the user, and beams inside the group cannot be sent simultaneously. At the same time, elements inside the same receive beam set group need to be obtained from different base station-side transmit beam groups.

TABLE 6a

| Receive beam set group_1 | Transmit beam index_1 | Antenna set group index-1 | Channel state information (such as RSRP) |
|---|---|---|---|

TABLE 6a-continued

| | | | |
|---|---|---|---|
| | Transmit beam index_2 | Antenna set group index-2 | Channel state information (such as RSRP) |
| | Transmit beam index_3 | Antenna set group index-1 | Channel state information (such as RSRP) |
| Receive beam set group-2 | Transmit beam index_4 | Antenna set group index-1 | Channel state information (such as RSRP) |
| | Transmit beam index_5 | Antenna set group index-2 | Channel state information (such as RSRP) |
| | Transmit beam index_6 | Antenna set group index-2 | Channel state information (such as RSRP) |
| ... | ... | ... | ... |

Optionally, Table 6b shows another embodiment of a report format combination format of a set including the beam index and the channel state information. A higher-level group is an antenna set group, and a lower-level group is a receive beam set group or a receiving-side spatial parameter. Optionally, the receiving-side spatial parameter may be a QCL ID under the receiving-side spatial parameter or a spatial parameter quantization value. The quantization areas may be different quantization steps and quantization ranges configured for different UEs. Under different antenna sets and the same receive beam set, the reported different transmit beams may be simultaneously received by the user and used in the spatial multiplexing mode. Under the same antenna set and the same receive beam set, the reported transmit beams may not be used in the spatial multiplexing mode, but may be simultaneously received by the user. Under different or the same user antenna group sets and different receive beam sets, the reported transmit beams may not be simultaneously received by the user. Beams under the same receive beam set group and the same antenna set group are quasi-co-located. The base station configures a base station-side transmit beam group for the user, and beams inside the group cannot be sent simultaneously. At the same time, elements inside the same receive beam set group need to be obtained from different base station-side transmit beam groups.

same channel characteristics and/or transmission scheme as one of any of the reference beams or reference signals in the set are placed into the same group, or share the same group information. The group information is the serial number or the index of the corresponding reference beam or of the reference signal carried by the reference beam.

In an optional embodiment, the above set further includes a reference beam index. The reference beam index is at least one of: a beam index fed back and reported by the receiving end, a reference signal index, an antenna port, a QCL assumption index, the virtual cell index, or the physical cell index.

In an optional embodiment, the receiving end obtains the reference beam index in the set in a manner of mapping the group information.

In the embodiment, the mapping manner described above may be performing mapping correspondingly by using the same function or a specific function, but is not limited thereto.

In an optional embodiment, the sending end combines the Q group(s) to generate R group(s). R is an integer and 1≤R≤Q.

In an optional embodiment, the set further includes T group(s) identified in the Q group(s) and the number of antenna ports of the T group(s). T is an integer and 1≤T≤Q.

TABLE 6b

| | | | |
|---|---|---|---|
| Antenna set group index-1 | Transmit beam index_1 | Receive beam set group sequence-1 | Channel state information (such as RSRP) |
| | Transmit beam index_2 | Receive beam set group sequence-1 | Channel state information (such as RSRP) |
| | Transmit beam index_3 | Receive beam set group sequence-2 | Channel state information (such as RSRP) |
| | ... | ... | ... |
| Antenna set group index-2 | Transmit beam index_18 | Receive beam set group sequence-1 | Channel state information (such as RSRP) |
| | Transmit beam index_19 | Receive beam set group sequence-2 | Channel state information (such as RSRP) |
| | ... | ... | ... |

In an optional embodiment, the receiving end performs grouping or sets group information in one of the following manners: performing grouping without a reference beam; or performing grouping based on a reference beam. The sending end notifies the receiving end of the reference beam through a reference signal index, QCL information, a virtual cell index, or a physical cell index.

In the embodiment, performing grouping without a reference beam refers to that beams having the same channel characteristic and/or transmission scheme are placed into the same group based merely on the result of the current measurement; and performing grouping based on a reference beam refers to that known reference beams or reference signals at the receiving end form a set, beams having the In an optional embodiment, a spatial parameter in the spatial parameter information set is obtained in one of the following manners: obtaining the spatial parameter according to a received reference signal; and obtaining the spatial parameter according to a relative value of a first spatial parameter corresponding to a reference beam and a second spatial parameter of the received reference signal.

In an optional embodiment, the set further includes one of the following information: a frequency domain response phase difference between beams corresponding to the one or more beam indexes;

and a subband response phase difference between beams corresponding to the one or more beam indexes.

In an optional embodiment, after the receiving end sends the set including the one or more beam indexes and the channel state information to the sending end, the receiving end sends set information of the set to the sending end. The set information includes at least one of: a panel on which each group is located, one or more groups sharing a panel, an antenna port at which each group is located, one or more groups sharing an antenna port, groups capable of sharing a frequency domain resource block, groups capable of sharing a time domain resource block, or an optimal beam in each group.

In an optional embodiment, before the receiving end receives the reference signals sent by the sending end, the receiving end receives a report format combination of the set sent by the sending end. The report format combination is used for indicating a format in which the set is sent by the receiving end.

In the embodiment, after the receiving end receives the report format combination, the receiving end may determine, according to the report format combination, the format in which the set is sent, thereby improving the sending efficiency of data and the compatibility between the receiving end and the sending end.

In an optional embodiment, after the receiving end receives the report format combination of the set sent by the sending end, the receiving end sends a report format request to the sending end. The report format request is used for instructing the sending end to allocate a time-frequency resource for feedback.

In the embodiment, after the sending end receives and acknowledges the report format request sent by the sending end, the sending end allocates a time-frequency resource for feedback.

In an optional embodiment, the above report format combination may include at least one of the following information: an optional subband bandwidth in subband channel state information, an optional format of the set, the number or the maximum number of groups in the set, the optional channel state information, an optional grouping criterion for the set, or an optional configuration criterion for a group index of the beam index and the channel state information.

Figure 3:
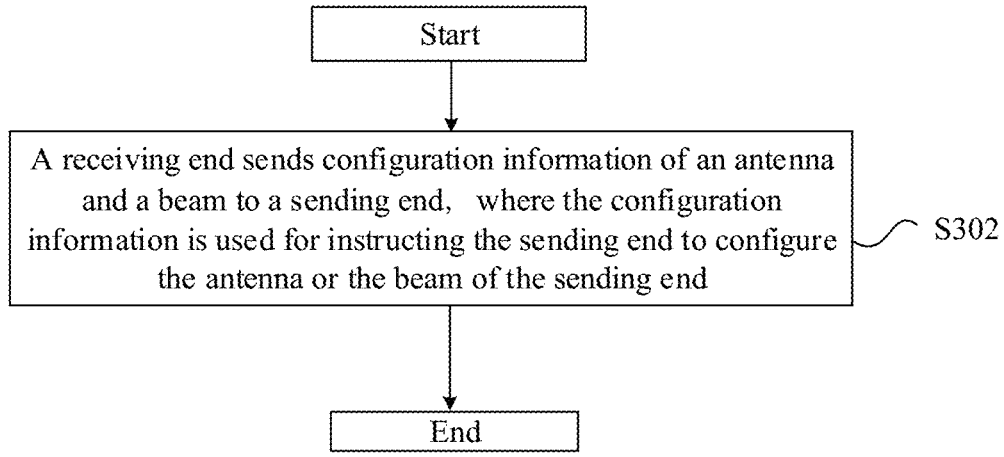
FIG. 3 is a flowchart of a configuration information feedback method according to an embodiment of the present disclosure.

FIG. 3 is a flowchart of a configuration information feedback method according to an embodiment of the present disclosure. As shown in FIG. 3, the configuration information feedback method includes the step described below.

In S302, a receiving end sends configuration information of an antenna and a beam to a sending end. The configuration information is used for instructing the sending end to configure the antenna or the beam of the sending end.

In the embodiment, configuration information of the antenna and the beam is sent to the sending end, so that the sending end rapidly configures the antenna and the beam, achieving rapid configuration of the antenna and the beam of the sending end.

In an optional embodiment, the configuration information includes at least one of the following information: the number of antenna panels; the number of TXRUs under each antenna panel; a threshold of a multi-stream beam spatial correlation characteristic; supporting separate division of the antenna port QCL; an optional subband bandwidth in configurable subband channel state information; supporting feedback of spatial parameter information; or supporting feedback of a beam index and channel state information based on a reference beam.

In the embodiment, the antenna panel may be a coherent panel, but is not limited thereto.

In an optional embodiment, one or more of the above antenna panels are provided.

In an optional embodiment, Table 7 lists a report format combination of a set including the beam number and the channel state information. Each group has a group index, a transmit beam index, a spatial parameter information set including a channel response correlation coefficient, and RSRP information. The group index may be mapped to a certain reference beam or reference signal set index by a table or function. That is, the group index is the reference beam or reference signal set index, which further represents that the group has the same or similar channel characteristic or the same transmission mode as the reference beam or the reference signal. The channel response correlation coefficient refers to the corresponding correlation value of two beams in the time domain or frequency domain channel. The channel response correlation coefficient c is calculated by the following formula:

$$c = \frac{H_{meas}^H H_{ref}}{\|H_{meas}\|_2 \|H_{ref}\|_2}. \qquad \text{Formula 1}$$

$H_{meas}$ represents a channel response of a target beam, and $H_{ref}$ represents a channel response under a reference beam.

TABLE 7

| Group index_1 (mapped to a certain reference beam or reference signal set index) | Transmit beam index_1 | Spatial parameter information set (channel response correlation coefficient) | RSRP |
| Group index_2 (mapped to a certain reference beam or reference signal set index) | Transmit beam index_2 | Spatial parameter information set (channel response correlation coefficient) | RSRP |
| Group index_3 (mapped to a certain reference beam or reference signal set index) | Transmit beam index_3 | Spatial parameter information set (channel response correlation coefficient) | RSRP |
| . . . | . . . | . . . | |

In an optional embodiment, Table 8 lists a report format combination of a set including the beam index and the channel state information. Each group includes a group index, a transmit beam index, a spatial parameter information set including a spatial correlation coefficient, and CQI information. The group index may be mapped to a certain reference beam or reference signal set index by a table or function. That is, the group index is the reference beam or reference signal set index, which further represents that the group has the same or similar channel characteristic or the same transmission mode as the reference beam or the reference signal. In the spatial parameter information set, the spatial correlation coefficient is expressed as a correlation value of a precoding weight corresponding to two beams, and the spatial correlation coefficient c is calculated by the following formula:

$$c = \frac{vec(W_{meas})^H vec(W_{ref})}{\|W_{meas}\|_2 \|W_{ref}\|_2}. \qquad \text{Formula 2}$$

$W_{meas}$ represents an antenna weight matrix of a two-dimensional (2D) measurement receive beam, and $W_{ref}$ represents an antenna weight matrix of a 2D reference receive beam.

TABLE 8

| Group index_1 (mapped to a certain reference beam or reference signal set index) | Transmit beam index_1 | Spatial correlation coefficient | CQI |
| Group index_2 (mapped to a certain reference beam or reference signal set index) | Transmit beam index_2 | Spatial correlation coefficient | CQI |
| Group index_3 (mapped to a certain reference beam or reference signal set index) | Transmit beam index_3 | Spatial correlation coefficient | CQI |
| ... | ... | ... | ... |

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device, or the like) to execute the method according to each embodiment of the present disclosure.

Second Embodiment

Figure 4:
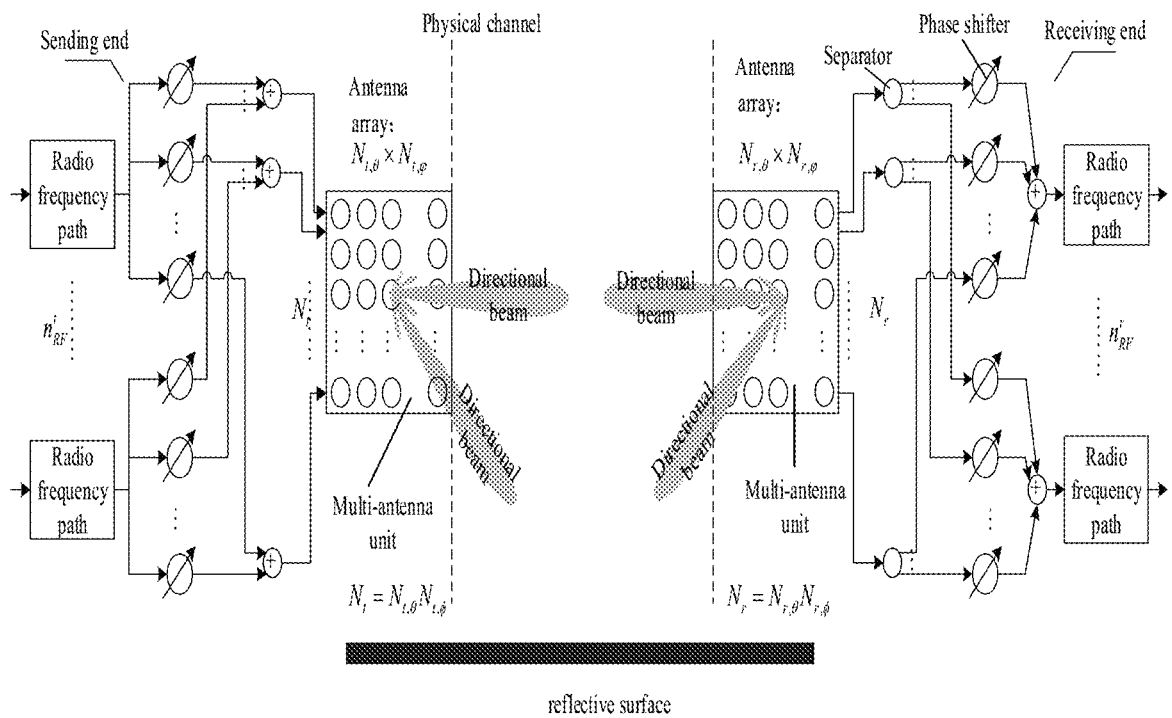
FIG. 4 is a schematic structural diagram of a hybrid precoding transceiver according to an optional embodiment of the present disclosure.

FIG. 4 is a structural diagram of a hybrid precoding transceiver according to an optional embodiment of the present disclosure. As shown in FIG. 4, a sending end and a receiving end each are configured with a multi-antenna unit and multiple radio frequency paths. Each radio frequency path is connected (or partially connected) to the antenna array unit, and each antenna unit has a digital keying phase shifter. The beamforming at the analog end is implemented in the high frequency band system by loading different phase shifts on the signals of the respective antenna units. Specifically, in the hybrid beamforming transceiver, multiple radio frequency signal streams exist. Each signal stream is sent from the multi-antenna unit to a high frequency band physical propagation channel by loading an antenna weight vector (AWV) via a digital keying phase shifter. At the receiving end, the radio frequency signal streams received by the multi-antenna unit are weighted and combined into a single signal stream. After radio frequency demodulation at the receiving end, multiple signal received streams are finally obtained by the receiver, and are sampled and received by the digital baseband. Therefore, the hybrid precoding (or referred to as hybrid analog digital beamforming) transceiver may simultaneously generate radio frequency beams directed to multiple directions.

Figure 5:
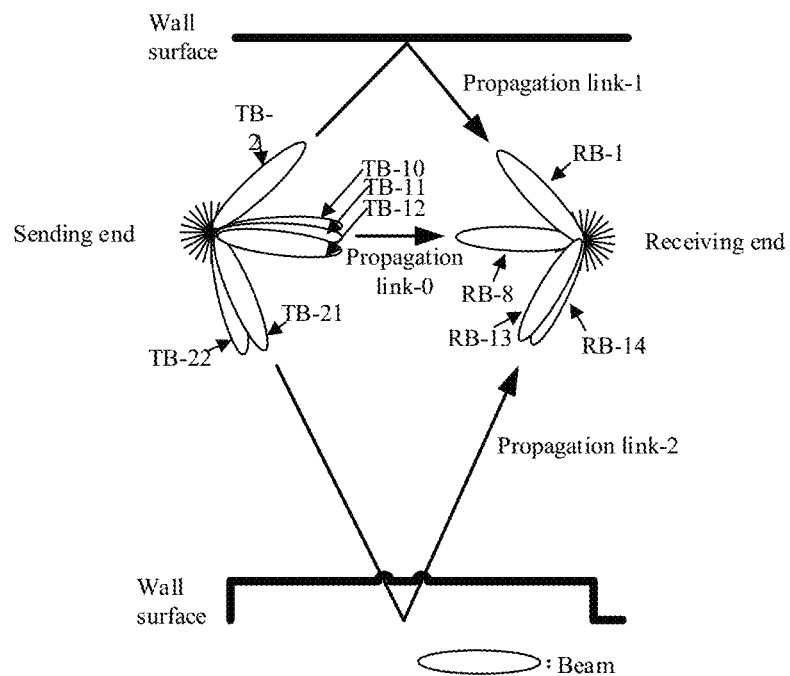
FIG. 5 is a schematic diagram of sending end beams, receiving end beams, and propagation channels according to an optional embodiment of the present disclosure.

FIG. 5 is a schematic diagram of sending end beams, receiving end beams, and propagation channels according to an optional embodiment of the present disclosure. As shown in FIG. 5, the sending end and the receiving end perform beam scanning and channel estimation. According to the channel estimation and the characteristics of receive beams, the receiving end faces multiple beam groups of different physical paths, separately. Each group may include one or more receive beams and one or more transmit beams. TB represents a transmit beam and RB represents a receive beam.

Figure 6:
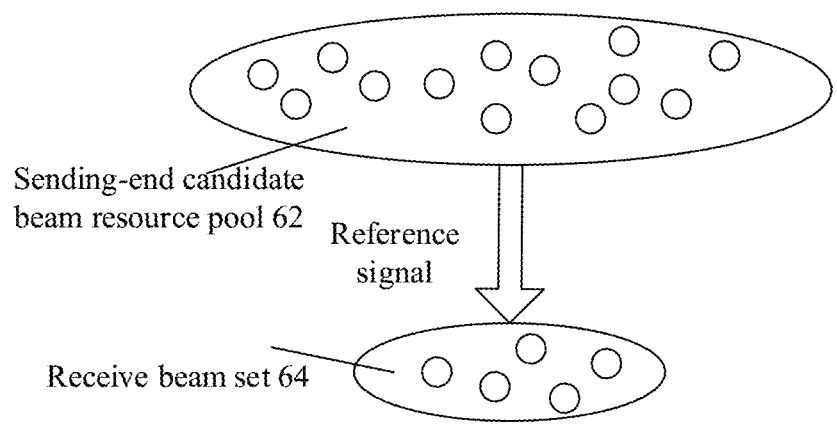
FIG. 6 is a first schematic diagram of a beam scanning set according to an optional embodiment of the present disclosure.

FIG. 6 is a first schematic diagram of a beam scanning set according to an optional embodiment of the present disclosure. As shown in FIG. 6, a reference signal is sent on a sending-end candidate beam corresponding to a beam-related channel state information-reference signal (CSI-RS) port or a time-frequency code position or a transmit beam index. The transmit beam index has a mapping relationship with the resource. The reference signal is sent by scanning transmit beams in a sending-end candidate beam resource pool 62. The receiving end receives the reference signal by using a receive beam in a receive beam set 64, and performs channel estimation.

Figure 7:
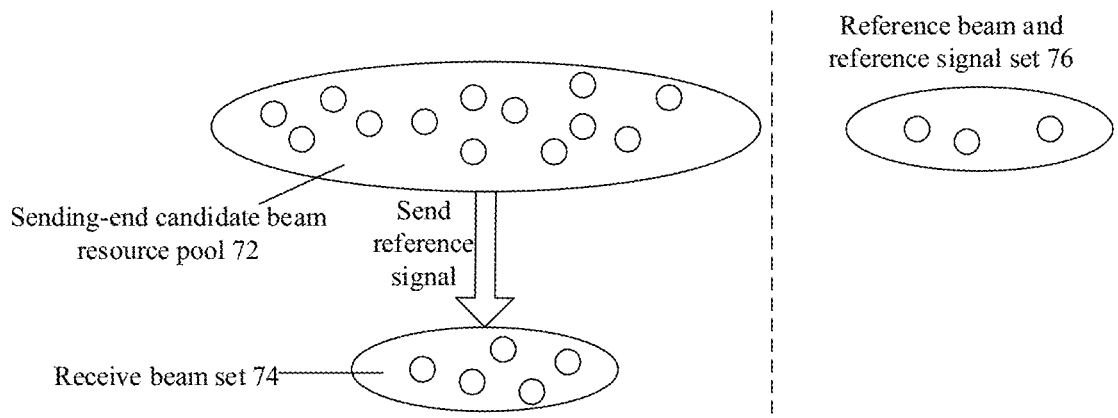
FIG. 7 is a second schematic diagram of a beam scanning set according to an optional embodiment of the present disclosure.

FIG. 7 is a second schematic diagram of a beam scanning set according to an optional embodiment of the present disclosure. As shown in FIG. 7, a sending-end candidate beam resource pool 72 sends a reference signal to a receiving-end receive beam set 74. The reference signal is sent on a sending-end candidate beam corresponding to a beam-related CSI-RS port or a time-frequency code position or a transmit beam index. The above transmit beam index has a mapping relationship with the resource. At the same time, a reference beam and reference signal set 76 exists for feeding back the beam index and the channel state information. The reference beam and reference signal set 76 is notified to a pilot receiving end through a downlink control indicator (DCI), a media access control-control element (DCI MAC-CE) or radio resource control (RRC) signaling. The reference signal is sent by scanning the transmit beam in the sending-end candidate beam resource pool 72. The receiving end receives the reference signal by using the receive beam in the receive beam set 74, and performs channel estimation.

Third Embodiment

Figure 8:
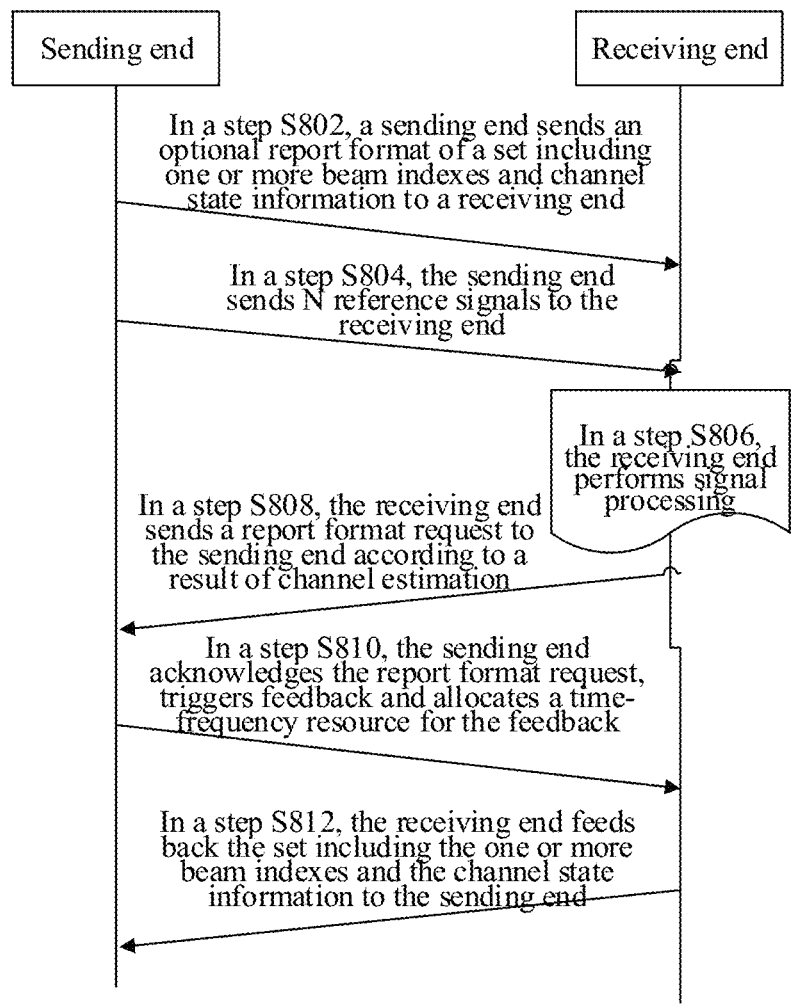
FIG. 8 is a first flowchart of a beam information feedback method according to an optional embodiment of the present disclosure.

FIG. 8 is a first flowchart of a beam information feedback method according to an optional embodiment of the present disclosure. As shown in FIG. 8, the beam information feedback method includes the steps described below.

In a step S802, a sending end sends an optional report format of a set including one or more beam indexes and channel state information to a receiving end. A group of optional report formats includes a set in which each element corresponds to a specific report format configuration mode, such as an optional sub-band feedback bandwidth and/or report mode schemes 1 to 4 described in the optional embodiments of the present disclosure.

In a step S804, the sending end sends N reference signals to the receiving end.

In a step S806, the receiving end performs signal processing, such as channel estimation and adjustment of the receive beam.

In a step S808, the receiving end sends a report format request to the sending end according to a result of the channel estimation.

In a step S810, the sending end acknowledges the report format request, triggers a feedback and allocates a time-frequency resource for the feedback.

In a step S812, the receiving end feeds back the set including the one or more beam indexes and the channel state information to the sending end.

Figure 9:
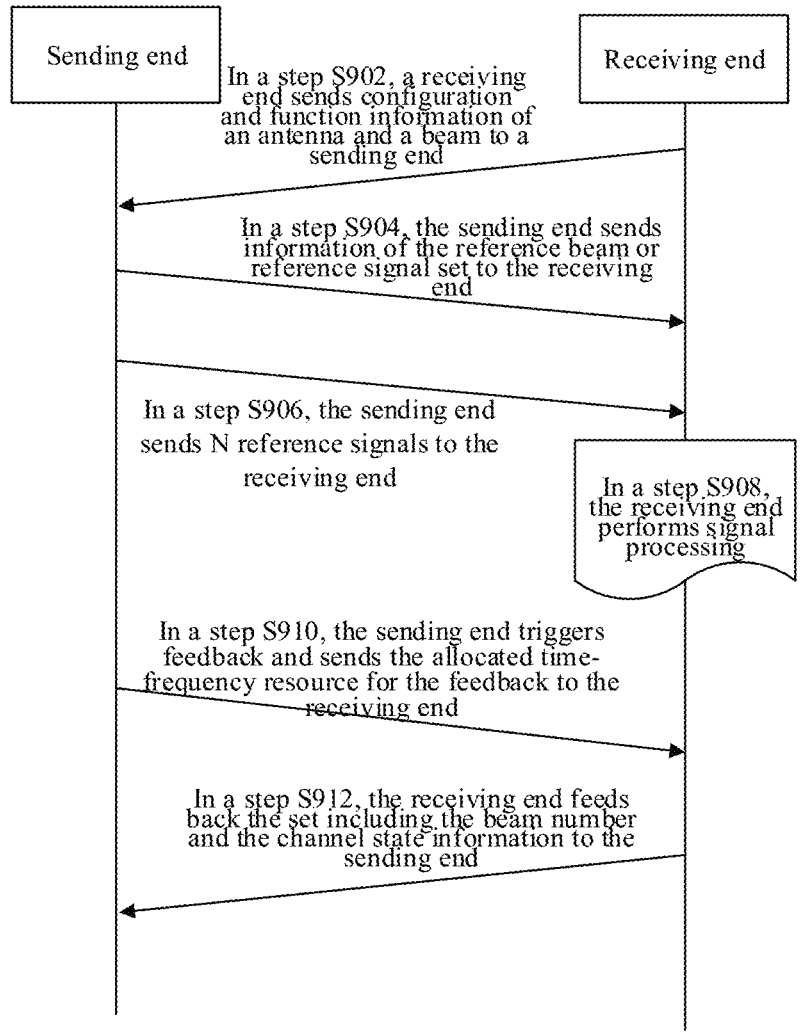
FIG. 9 is a second flowchart of a beam information feedback method according to an optional embodiment of the present disclosure.

FIG. 9 is a second flowchart of a beam information feedback method according to an optional embodiment of the present disclosure. As shown in FIG. 9, the beam information feedback method includes the steps described below.

In a step S902, a receiving end sends configuration and function information of an antenna and a beam to a sending end. The configuration and function information of the antenna and the beam includes at least one of the following information: the number of antenna panels; the number of TXRUs under each antenna panel; a threshold of a multi-stream beam spatial correlation characteristic; supporting separate division of the antenna port QCL; an optional subband bandwidth in configurable subband channel state information; supporting feedback of spatial parameter information; or supporting feedback of a beam index and channel state information based on a reference beam.

In a step S904, the sending end sends information of the reference beam or a reference signal set to the receiving end.

In a step S906, the sending end sends N reference signals to the receiving end.

In a step S908, the receiving end performs signal processing, such as channel estimation and adjustment of the receive beam.

In a step S910, the sending end triggers a feedback and sends the allocated time-frequency resource for the feedback to the receiving end.

In a step S912, the receiving end feeds back the set including the beam number and the channel state information to the sending end. Optionally, the receiving end feeds back the set including the beam number and the channel state information to the sending end according to the default report format or the report format configured through the higher-layer MAC-CE or RRC.

Fourth Embodiment

The present embodiment further provides a beam information feedback apparatus. The apparatus is used for implementing the above-mentioned embodiments and preferred embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 10:
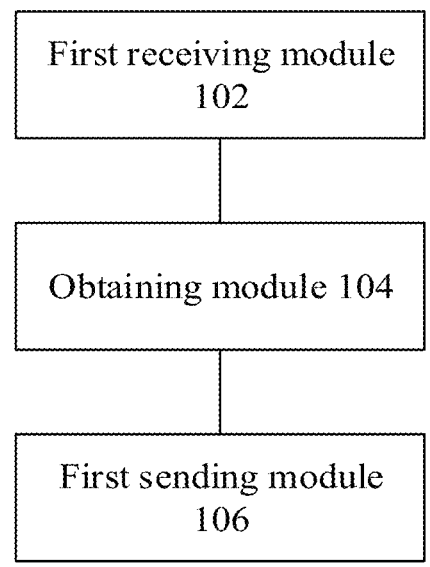
FIG. 10 is a block diagram of a beam information feedback apparatus according to an embodiment of the present disclosure.

FIG. 10 is a structural block diagram of a beam information feedback apparatus according to the embodiment of the present disclosure. As shown in FIG. 10, the apparatus includes: a first receiving module 102, which is configured to receive reference signals sent by a sending end, where the reference signals are carried on one or more beams, or each reference signal group is carried on a same beam, and the reference signal group is obtained by grouping the reference signals with one or more time-frequency-code resources; an obtaining module 104, which is configured to obtain one or more beam indexes and channel state information according to the reference signals; and a first sending module 106, which is configured to send a set including the one or more beam indexes and the channel state information to the sending end.

In an optional embodiment, the set described above includes Q group(s), and Q is an integer greater than or equal to 1; and each group includes at least one of: at least one of the one or more beam indexes, the channel state information, group information or a spatial parameter information set.

In an optional embodiment, the above beam index includes at least one of: a transmit beam index or a receive beam index; the channel state information includes at least one of: transmit beam channel state information, receive beam channel state information, or transmit beam and receive beam combined channel state information; and the spatial parameter information set includes at least one of: a transmit beam spatial parameter information set, a receive beam spatial parameter information set, or a transmit beam and receive beam combined spatial parameter information set.

Figure 11:
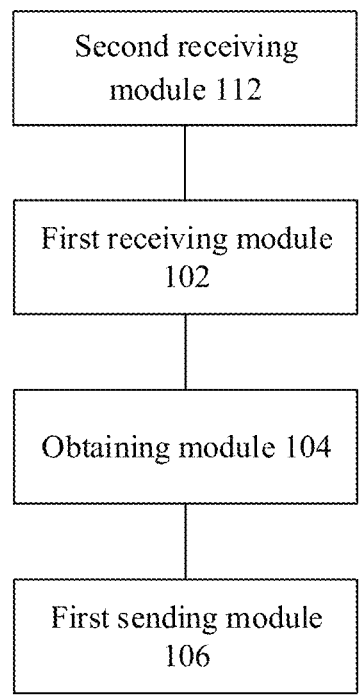
FIG. 11 is a first block diagram of a beam information feedback apparatus according to an optional embodiment of the present disclosure.

In an optional embodiment, FIG. 11 is a first block diagram of a beam information feedback apparatus according to an optional embodiment of the present disclosure. As shown in FIG. 11, the apparatus includes, in addition to all modules shown in FIG. 10, a second receiving module 112 configured to receive a report format combination of the set sent by the sending end. The report format combination is used for instructing the receiving end to send the format of the set.

Figure 12:
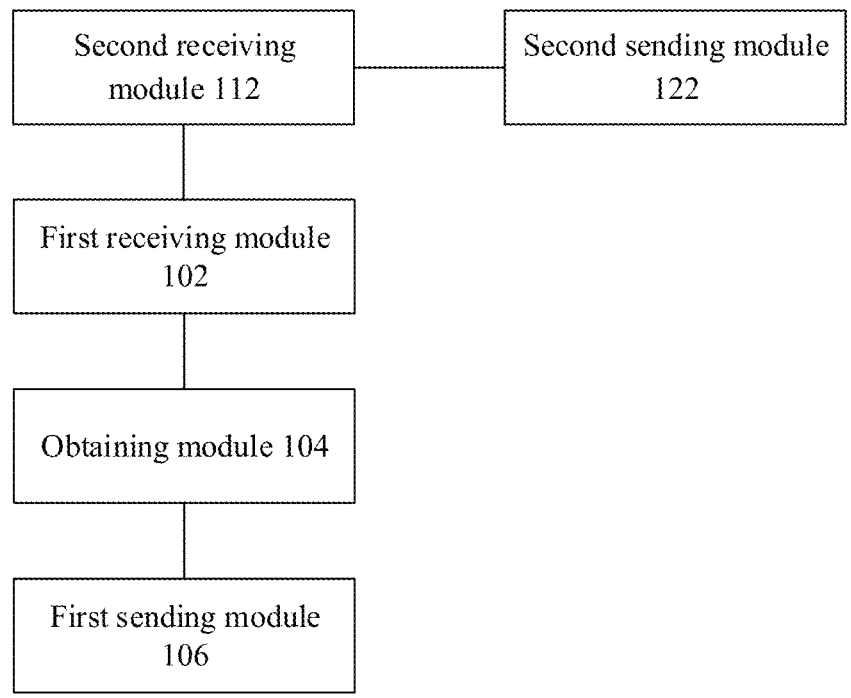
FIG. 12 is a second block diagram of a beam information feedback apparatus according to an optional embodiment of the present disclosure.

In an optional embodiment, FIG. 12 is a second block diagram of a beam information feedback apparatus according to an optional embodiment of the present disclosure. As shown in FIG. 12, the apparatus includes, in addition to all modules shown in FIG. 11, a second sending module 122 configured to send a report format request to the sending end. The report format request is used for instructing the sending end to allocate a time-frequency resource for a feedback.

Figure 13:
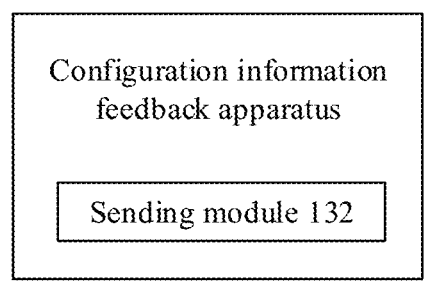
FIG. 13 is a block diagram of a configuration information feedback apparatus according to an embodiment of the present disclosure.

An embodiment further provides a configuration information feedback apparatus. FIG. 13 is a structural block diagram of the configuration information feedback apparatus according to the embodiment of the present disclosure. As shown in FIG. 13, the apparatus includes a sending module 132 configured to send configuration information of an antenna and a beam to the sending end. The configuration information is used for instructing the sending end to configure the antenna or the beam of the sending end.

In an optional embodiment, the configuration information includes at least one of the following information: the number of antenna panels; the number of TXRUs under each antenna panel; a threshold of a multi-stream beam spatial correlation characteristic; supporting separate division of the antenna port QCL; an optional subband bandwidth in configurable subband channel state information; supporting feedback for spatial parameter information; or supporting feedback of a beam index and channel state information based on a reference beam.

It is to be noted that the various modules described above may be implemented by software or hardware. Implementation by hardware may, but may not necessarily, be performed in the following manners: the various modules described above are located in a same processor, or the various modules described above are located in different processors in any combination form.

Fifth Embodiment

The embodiment further provides a receiving end. The receiving end is used for implementing the above-mentioned embodiments and preferred embodiments. What has been described will not be repeated.

The receiving end includes a communication apparatus and a processor. The communication apparatus is configured to: receive reference signals sent by a sending end, where the reference signals are carried on one or more beams, or each reference signal group is carried on a same beam, and the reference signal group is obtained by grouping the reference signals with one or more time-frequency-code resources; and send a set including one or more beam indexes and channel state information to the sending end. The processor is configured to obtain the set according to reference signals.

In an optional embodiment, the set described above includes Q group(s), and Q is an integer greater than or equal to 1; and each group includes at least one of: the one or more beam indexes, the channel state information, group information or a spatial parameter information set.

The embodiment further provides a receiving end. The receiving end includes a communication apparatus which is configured to send configuration information of an antenna and a beam to a sending end. The configuration information is used for instructing the sending end to configure the antenna or the beam of the sending end.

In an optional embodiment, the configuration information includes at least one of the following information: the number of antenna panels; the number of TXRUs under each antenna panel; a threshold of a multi-stream beam spatial correlation characteristic; supporting separate division of the antenna port QCL; an optional subband bandwidth in configurable subband channel state information; supporting feedback of spatial parameter information; or supporting feedback of a beam index and channel state information based on a reference beam.

The embodiment of the present disclosure further provides a storage medium. Optionally, in the embodiment, the storage medium may be configured to store program codes for executing steps described below. In S1, a receiving end receives reference signals sent by a sending end, where the reference signals are carried on one or more beams, or each reference signal group is carried on a same beam, and the reference signal group is obtained by grouping the reference signals with one or more time-frequency-code resources. In S2, the receiving end obtains one or more beam indexes and channel state information according to the reference signals. In S3, the receiving end sends a set including the one or more beam indexes and the channel state information to the sending end.

Optionally, the storage medium is further configured to store program codes for executing a step described below. The receiving end selects a beam by at least one of the following criteria: the maximum signal-to-noise ratio of the receiving end; the maximum signal to interference plus noise ratio of the receiving end; the maximum received signal strength; or the maximum received signal quality.

Optionally, the storage medium is further configured to store program codes for executing a step described below. The group information is transmitted in one of the following manners: a time-frequency-code resource carrying the group information; and explicitly outputting the group information.

Optionally, the storage medium is further configured to store program codes for executing steps described below. The receiving end performs grouping or sets group information in one of the following manners: performing grouping without a reference beam; and performing grouping based on a reference beam. The sending end notifies the receiving end of the reference beam through a reference signal index, QCL information, a virtual cell index, or a physical cell index.

Optionally, the storage medium is further configured to store program codes for executing a step described below. The receiving end obtains the reference beam index in the set in a manner of mapping the group information.

Optionally, the storage medium is further configured to store program codes for executing a step described below. The sending end combines the Q group(s) to generate R group(s). R is an integer and $1 \leq R \leq Q$.

Optionally, the storage medium is further configured to store program codes for executing a step described below. A spatial parameter in the spatial parameter information set is obtained in one of the following manners: obtaining the spatial parameter according to the received reference signals; and obtaining the spatial parameter according to a relative value of a first spatial parameter corresponding to a reference beam and a second spatial parameter of the received reference signals.

Optionally, the storage medium is further configured to store program codes for executing a step described below. The receiving end sends set information of the set to the sending end. The set information includes at least one of: a panel on which each group is located, one or more groups sharing a panel, an antenna port at which each group is located, one or more of groups of sharing an antenna port, groups capable of sharing a frequency domain resource block, groups capable of sharing a time domain resource block, or an optimal beam in each group.

Optionally, the storage medium is further configured to store program codes for executing a step described below. the receiving end receives a report format combination of the set sent by the sending end. The report format combination is used for indicating a format in which the set is sent by the receiving end.

Optionally, the storage medium is further configured to store program codes for executing a step described below. The receiving end sends a report format request to the sending end. The report format request is used for instructing the sending end to allocate a time-frequency resource for feedback.

The embodiment of the present disclosure further provides a storage medium. Optionally, in the embodiment, the storage medium may be configured to store program codes for executing a step described below. The receiving end sends configuration information of an antenna and a beam to the sending end. The configuration information is used for instructing the sending end to configure the antenna or the beam of the sending end.

Optionally, in the embodiment, the storage medium may include, but is not limited to, a USB flash disk, a read-only memory (ROM), a random access memory (RAM), a mobile hard disk, a magnetic disk, an optical disk or another medium capable of storing the program codes.

Optionally, for specific examples in the embodiment, reference may be made to the examples described in the above-mentioned embodiments and optional embodiments, and repetition will not be made in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

The present disclosure is applicable to the field of communications, and is used for solving the problem of decreased diversity and multiplexing gain of a system because the sending end cannot perform accurate and flexible data transmission according to correlation from the receiving end since the receiving end cannot feed back the correlation between beams due to the receiving end failing to obtain the beam index and the channel state information according to the feedback from the sending send. Thus, the sending end can perform accurate and flexible data transmission according to the related characteristics of the receiving end, and the diversity and multiplexing gain of the system are improved.

What is claimed is:

1. A communication method, comprising:
   receiving, by a first communication node from a second communication node, a group of reference signals that are carried either on respective beams or on a same beam, wherein the group of reference signals are determined based on one or more time-frequency-code resources;
   determining, by the first communication node based on the group of reference signals, one or more beam indexes and channel state information; and
   transmitting, by the first communication node to the second communication node, a set including the one or more beam indexes and the channel state information,
   wherein the set includes Q groups, Q being an integer greater than 1, each of the Q groups including at least one of: the channel state information or one of the one or more the beam indexes, and
   wherein the Q groups correspond to the same receive beam or beamforming implementation mode.

2. The communication method of claim 1, wherein one of the one or more beam indexes corresponds to a resource index.

3. The communication method of claim 1, wherein transmission schemes corresponding to the Q groups having the same group information are the same.

4. A wireless communications apparatus comprising a processor configured to implement a method recited in claim 1.

5. A wireless communications apparatus comprising a processor configured to implement a method recited in claim 2.

6. A wireless communications apparatus comprising a processor configured to implement a method recited in claim 3.

7. A communication method, comprising:
   sending, by a second communication node to a first communication node, a group of reference signals that are carried either on respective beams or on a same beam, wherein the group of reference signals are determined based on one or more time-frequency-code resources; and
   receiving, by the second communication node from the first communication node, a set including the one or more beam indexes and the channel state information determined by the first communication node based on the group of reference signals,
   wherein the set includes Q groups, Q being an integer greater than 1, each of the Q groups including at least one of: the channel state information or one of the one or more beam indexes, and
   wherein the Q groups correspond to the same receive beam or beamforming implementation mode.

8. The communication method of 7, wherein one of the one or more beam indexes corresponds to a resource index.

9. The communication method of 7, wherein the transmission schemes corresponding to the Q groups having the same group information are the same.

10. A wireless communications apparatus comprising a processor configured to implement a method recited in claim 7.

11. A wireless communications apparatus comprising a processor configured to implement a method recited in claim 8.

12. A wireless communications apparatus comprising a processor configured to implement a method recited in claim 9.

* * * * *

UNITED STATES PATENT AND TRADEMARK OFFICE
CERTIFICATE OF CORRECTION

Page 1 of 1

PATENT NO. : 10,917,159 B2
APPLICATION NO. : 16/505243
DATED : February 9, 2021
INVENTOR(S) : Bo Gao et al.

It is certified that error appears in the above-identified patent and that said Letters Patent is hereby corrected as shown below:

In the Claims

Claim 1, at Column 21, Line 38, please delete "or more the beam indexes" and replace with -- or more beam indexes -- and at Column 21, Line 39, please delete ""the same receive" and replace with -- a same receive --

Claim 4, at Column 22, Line 5, please delete "a method recited" and replace with -- the communication method recited --

Claim 5, at Column 22, Line 8, please delete "a method recited" and replace with -- the communication method recited --

Claim 6, at Column 22, Line 11, please delete "a method recited" and replace with -- the communication method recited --

Claim 7, at Column 22, Line 26, please delete "or more the beam indexes" and replace with -- or more beam indexes -- and at Column 22, Line 27, please delete ""the same receive" and replace with -- a same receive --

Claim 10, at Column 22, Line 35, please delete "a method recited" and replace with -- the communication method recited --

Claim 11, at Column 22, Line 38, please delete "a method recited" and replace with -- the communication method recited --

Claim 12, at Column 22, Line 41, please delete "a method recited" and replace with -- the communication method recited --

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*